US006623657B1

(12) United States Patent
Berglund et al.

(10) Patent No.: US 6,623,657 B1
(45) Date of Patent: Sep. 23, 2003

(54) WATER-ACTIVATED, EXOTHERMIC CHEMICAL DEICING FORMULATIONS

(75) Inventors: Kris A. Berglund, Okemos, MI (US); Dilum D. Dunuwila, Okemos, MI (US); Hasan Alizadeh, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 10/125,147

(22) Filed: Apr. 18, 2002

(51) Int. Cl.$^7$ ................................................. C09K 3/18
(52) U.S. Cl. .......................................... 252/70; 106/13
(58) Field of Search ............................... 252/70; 106/13

(56) References Cited

U.S. PATENT DOCUMENTS

| | | | |
|---|---|---|---|
| 4,071,327 A | * | 1/1978 | Dorer, Jr. ..................... 44/398 |
| 4,191,348 A | | 3/1980 | Holwerda |
| 4,254,821 A | | 3/1981 | Matsuda et al. |
| 4,400,285 A | | 8/1983 | Gancy |
| 4,425,251 A | | 1/1984 | Gancy |
| 4,448,702 A | * | 5/1984 | Kaes ........................... 252/70 |
| 4,573,802 A | | 3/1986 | Kerrigan et al. |
| 4,692,259 A | | 9/1987 | Roman |
| 4,826,107 A | | 5/1989 | Thornton-Trump |
| 5,096,145 A | | 3/1992 | Phillips et al. |
| 5,244,168 A | | 9/1993 | Williams |
| 5,334,323 A | | 8/1994 | Schrimpf et al. |
| 5,635,101 A | | 6/1997 | Janke et al. |
| 5,709,812 A | | 1/1998 | Janke et al. |
| 5,709,813 A | | 1/1998 | Janke et al. |
| 5,772,912 A | | 6/1998 | Lockyer et al. |
| 5,845,848 A | | 12/1998 | Amako et al. |
| 6,156,226 A | * | 12/2000 | Klyosov et al. .............. 252/70 |
| 6,287,480 B1 | | 9/2001 | Berglund et al. |

FOREIGN PATENT DOCUMENTS

EP 077767 4/1983

OTHER PUBLICATIONS

Highway Deicing: Comparing Salt and Calcium Magnesium Acetate 235, Transportation Research Board Comm., WA DC (1991).
Miller, Ways to Help Bridges and Deicers Coexist: CMA Cuts Corrosion on Zilwaukee Bridge, Better Roads (1993).
Strawn, CMA has Role to Play in Critical Applications, Kuennen, Ed., Roads & Bridges, (1993).
The Handbook of Test Methods for Evaluating Chemical Deicers, SHRP–H/WP–90, Strategic Highway Research Program, WA, DC (1992).

* cited by examiner

*Primary Examiner*—Anthony J. Green
(74) *Attorney, Agent, or Firm*—Ian C. McLeod

(57) ABSTRACT

Deicing compositions are provided for removing ice from a surface which include either succinic acid or succinic anhydride, or both, and a neutralizing base such as sodium hydroxide, potassium hydroxide, or ammonium hydroxide wherein the deicing compositions when mixed with water produce succinate salts in a reaction that rapidly releases sufficient heat to melt the ice on the surface and the succinate salts act as a deicer and freezing point depressant. In particular embodiments, the deicing compositions further include a glycol which inhibits reformation of the ice on the deiced surface. The deicing compositions are suitable and effective for airport applications in which corrosion of aircraft alloys and concrete runways are of concern.

29 Claims, 7 Drawing Sheets

WATER-ACTIVATED, EXOTHERMIC CHEMICAL DEICING FORMULATIONS

CROSS-REFERENCE TO RELATED APPLICATION

Not applicable.

STATEMENT REGARDING FEDERALLY SPONSORED RESEARCH OR DEVELOPMENT

Not Applicable.

Reference to a "Computer Listing Appendix Submitted on a Compact Disc"

Not Applicable.

BACKGROUND OF THE INVENTION

(1) Field of the Invention

The invention relates to deicing compositions for removing ice from a surface which include either succinic acid or succinic anhydride, or both, and a neutralizing base such as sodium hydroxide, potassium hydroxide, or ammonium hydroxide wherein the deicing compositions when mixed with water produce succinic salts in a reaction that rapidly releases sufficient heat to melt the ice on the surface and the succinate salts act as a deicer and freezing point depressant. In particular embodiments, the deicing compositions further include a glycol which inhibits reformation of the ice on the deiced surface. The deicing compositions are suitable and effective for airport applications in which corrosion of aircraft alloys and concrete runways are of concern.

(2) Description of Related Art

Chemical deicing is routinely used during the winter season to maintain safer mobility on highways, residential and commercial surface structures that include, parking lots, walkways, driveways, and the like. Airports and airbases also use a combination of mechanical devices and anti-icing chemicals to insure safe operations during the winter months.

Common road salt is the most widely used deicing chemical on highways. It is effective, inexpensive, reliable, and easy to store and apply. An estimated 10 million tons at $35/ton is used each year (In Highway Deicing: Comparing Salt and Calcium Magnesium Acetate, Special Report 235, Transportation Research Board Committee on the Comparative Costs of Rock Salt and CMA for Highway Deicing, Washington, D.C., (1991)). The major problem with road salt is that it is associated with costly damages to highway infrastructure, motor vehicles, and the environment. Structural damages include concrete degradation and steel corrosion leading to high maintenance expenditure. Foliage burns, soil compaction, and water contamination are some of the adverse environmental manifestations of sodium chloride use.

Due to the problems associated with the use of chloride salts as road deicing chemicals, a less harmful road deicing chemical, namely calcium magnesium acetate (CMA), has been commercialized (Miller, Ways to Help Bridges and Deicers Coexist: CMA Cuts Corrosion on Zilwaukee Bridge, Better Roads, (February 1993); Strawn, CMA has Role to Play in Critical Applications, Kuennen, Ed., Roads & Bridges, (March 1993)). Calcium magnesium acetate inhibits concrete degradation and corrosion. It is a low environmental impact deicer. The downside of CMA use is its cost, which at $925.00/ton, is 20 times as much as common road salt. Furthermore, it is not a very effective deicer.

ICEBAN is a recent development by Natural Solutions Corporation (100 Volvo Parkway, Suite 200, Chesapeake, Va. 23320). ICEBAN is a natural liquid concentrate residue prepared from the organic by-products from cheese making, the production of alcohol, or the wet milling of corn (U.S. Pat. No. 5,709,812, 5,709,813, and 5,635,101 to Janke et al.). It is non corrosive and has good anti-icing and deicing properties. However, the most notable downside of ICEBAN is that it is formulated as a liquid deicer. Equipment currently used for spreading of deicers are configured for solid deicers. Switching to a liquid deicer requires equipment reconfigurations leading to significant capital investment in addition to the capital required for storage tanks. The viscosity of the liquid at low temperatures may pose additional problems.

European Patent EP82890136.5 to Kaes claimed that a dicarboxylic acid mixture consisting of adipic acid (30–35 wt %), glutaric acid (40–50 wt %), and succinic acid (20–25 wt %) in the form of a potash salt is suitable for airport deicing. Although this formulation, in liquid form, possesses acceptable deicing characteristics, it is corrosive to metals and, therefore, it does not comply with the standard for aircraft metals. It is four times more corrosive than potassium succinate toward dichromate treated magnesium, which is the aircraft metal alloy that is most susceptible to corrosion. Further, this product has never been commercialized.

The deicing chemicals discussed above penetrate or melt ice as a result of their tendency to form aqueous solutions that have lower freezing points. In an attempt to enhance this process, U.S. Pat. No. 4,692,259 to Roman; U.S. Pat. No. 4,400,285 to Gancy; and U.S. Pat. No. 4,425,251 to Gancy have disclosed formulations that release heat upon contact with water. The results are dual-action chemical deicers that melt ice using the heat from the exothermic reaction between the agent and water and using the freezing point depressant effect of the resulting solution.

U.S. Pat. No. 4,692,259 to Roman in its preferred embodiment presents a deicing composition that utilizes the heat of reaction of magnesium with water and the freezing point depressant effect of the resulting chloride salts.

U.S. Pat. Nos. 4,400,285 and 4,425,251 to Gancy combines the exothermicity of the contact between calcium oxide and water and the freezing point depressant effect of acetate salts to formulate dual-action deicers.

Such inventions have endeavored to formulate deicers that posses a short term exothermic response and a long term freezing point depression effect which act in a complimentary fashion to infuse a superior ice-melting function to deicers. However, the invention disclosed by U.S. Pat. No. 4,692,259 to Roman contains chloride salts. Chloride induced corrosion of metal and degradation of concrete is well documented (Miller, Ways to Help Bridges and Deicers Coexist: CMA Cuts Corrosion on Zilwaukee Bridge, Better Roads, (February 1993); Strawn, CMA has Role to Play in Critical Applications, Kuennen, Ed., Roads & Bridges, (March 1993)). In the presence of adequate moisture and oxygen, chloride ions accelerate the corrosion process by increasing the conductivity of solutions. In addition, chloride salts, especially calcium and magnesium chloride, increase the metal-moisture contact time thereby promoting the corrosion process. In addition, there is clear evidence for the cumulative and long-lasting impact of chloride salt on the environment (Strawn, CMA has Role to Play in Critical Applications, Kuennen, Ed., Roads & Bridges, (March 1993)). Salt-mist and salt solutions damage roadside vegetation. Salt solution run off causes soil compaction and high salinity reducing soil fertility and permeability leading to loss of vegetation followed by soil erosion. Both California and New York have had to take extraordinary steps to curtail the impact of road salt to the Tahoe National Forest and the Adirondack Park, respectively. Therefore, any deicer, regardless of whether it is conventional or dual-action, will have no appeal to niche markets where it is absolutely essential to minimize degradation of structures due to corrosion and minimize loss of vegetation and habitats.

The dual-action formulations disclosed in U.S. Pat. No. 4,425,251 to Gancy and U.S. Pat. No. 5,334,323 to Schrimpf et al. contain acetate salts. Acetate salts have been shown to be safer alternatives to chloride salts. Acetate-based deicers such as CMA are non corrosive toward steel and aluminum and have little or no impact on the environment. However, acetate salts are too expensive for general use on road structures and are not suitable for application on airports, airbases and airplanes.

Presently, aircraft deicing is carried out by applying propylene glycol based deicing fluids. These fluids are sprayed on aircraft to lift accumulated ice and it is believed that propylene glycol prevents ice buildup. Numerous composition and method patents exist on this application and have been disclosed in U.S. Pat. No. 4,191,348 to Holwerda; U.S. Pat. No. 4,254,821 to Matsuda et al.; U.S. Pat. No. 4,573,802 to Kerrigan et al.; U.S. Pat. No. 4,826,107 to Thornton-Trump.; U.S. Pat. No. 5,096,145 to Phillips et al.; U.S. Pat. No. 5,244,168 to Williams; and U.S. Pat. No. 5,845,848 to Amako et al. Propylene glycol, in general, is not considered to be an effective deicer. It is regarded as an anti-icer that prevents ice buildup. Many inventors have claimed methods to preheat the anti icing fluids consisting of glycols to force deicing action. These methods employ a heat source and a heat exchanger, in numerous configurations, to supply heat prior to application. They are not suitable for rapid deployment notwithstanding the costs involving the use of an external heat source.

With regard to snow and ice removal at airports and airbases and on aircrafts, chemical deicing has not been practiced widely because of the lack of a chemical deicing agent that complies with the aircraft metal standards. Airport and airbase deicers need to comply with stringent criteria. These criteria are set to protect specialty alloys used in aircrafts in structurally critical areas. Therefore, a need remains for a chemical deicer that is effective at removing ice and which complies with the standards required for deicers intended to be used in deicing operations on and around aircraft.

SUMMARY OF THE INVENTION

The invention provides deicing compositions for removing ice from a surface which include either succinic acid or succinic anhydride, or both, and a neutralizing base such as sodium hydroxide or potassium hydroxide wherein the deicing compositions when mixed with water produce succinate salts in a reaction that rapidly releases sufficient heat to melt the ice on the surface and the succinate salts act as a deicer and freezing point depressant. In particular embodiments, the compositions further include a glycol which inhibits reformation of the ice on the deiced surface. The deicing compositions are suitable and effective for airport applications in which corrosion of aircraft alloys and concrete runways are of concern.

Therefore, the present invention provides a process for inhibiting or reducing icing or snow on a surface which comprises (a) mixing as reactants an acidic succinate compound and a base in an aqueous solution to produce a succinate salt at a pH between 4 and 11 as the deicing composition, wherein the reactants heat the solution; and (b) applying the heated solution to the surface to rapidly melt ice and snow.

The present invention further provides a process for producing a heated solution for applying heat to a surface to melt ice or snow which comprises (a) mixing as reactants a pre-measured acidic succinic compound and a base into an aqueous solution to produce a succinate salt at a pH between about 4 and 11; and (b) transferring the heated solution so as to apply heat to the surface for melting ice and snow.

In a further embodiment of the process, the compounds are in a dry, granular form and are in at least one container for use in step (a).

In particular embodiments of the above processes, the acidic succinic compound is selected from the group consisting of succinic anhydride, succinic acid, and mixtures thereof. Further still, it is preferable that the base is selected from the group consisting of an alkali metal, an alkaline earth metal, a hydroxy organic base, and mixtures thereof. In a further preferred embodiment, the base is selected from the group consisting of sodium hydroxide, potassium hydroxide, ammonium hydroxide, and mixtures thereof. In a further embodiment, a polyhydric alcohol anti-icing organic compound is mixed with the solution applied in step (b). Preferably, the polyhydric alcohol is a glycol selected from the group consisting of ethylene glycol, diethylene glycol, propylene glycol, and dipropylene glycol propylene glycol. More preferably, the glycol is propylene glycol.

Further still, the present invention provides a kit for use in producing a heated solution which comprises (a) at least one container of pre-measured amounts of compounds which react exothermally to produce a succinate salt at a pH between about 4 and 11 when combined with predetermined amounts of water to produce the heated solution, wherein the compounds are an acidic succinate compound and a base; and (b) instructions in the kit for combining the compounds with water to produce the heated solution.

Further still, the present invention provides a kit for sale as a unit in producing a heated solution which comprises pre-measured amounts of compounds which react exothermally to produce a succinate salt at a pH between about 4 and 11 when combined with predetermined amounts of water to produce the heated solution, wherein the compounds are an acidic succinic compound and a base. The kit is particularly useful as a warming device for use as a hot pack for medical treatments, hand warmers, seat warmers, and food warmers.

In a further embodiment of the kit, the kit contains an additional container of water to combine with the components.

In an embodiment further still, the compounds which react are contained in separate containers which are sold as a unit.

In a further still embodiment of the kit, the containers have an openable seal between the containers for mixing.

In a further embodiment of the kit, the compounds are in a dry, granular form.

In a preferred embodiment, the acidic succinic compound is selected from the group consisting of succinic anhydride, succinic acid, and mixtures thereof. In a further preferred embodiment, the base is selected from the group consisting of an alkali material, an alkaline earth metal, a hydroxy organic base, and mixtures thereof. In a further preferred embodiment, the base is selected from the group consisting of sodium hydroxide, potassium hydroxide, ammonium hydroxide, and mixtures thereof. In a further embodiment of the kit, the kit further includes a polyhydric alcohol anti-icing organic compound. Preferably, the polyhydric alcohol is a glycol selected from the group consisting of ethylene glycol, diethylene glycol, propylene glycol, and dipropylene glycol propylene glycol. More preferably, the glycol is propylene glycol.

OBJECTS

Therefore, it is an object of the present invention to provide heated deicing compositions that are effective at melting ice on a surface and which comply with the standards required for deicers intended to be used in deicing operations on and around aircrafts.

It is a further object of the present invention to provide heated deicing compositions that are effective at melting ice on a surface and which are minimally corrosive to metal alloys and concrete.

It is a further object of the present invention to provide heated deicing compositions that are effective at melting ice on a surface and which inhibit the reformation of ice on the surface.

These and other objects of the present invention will become increasingly apparent with reference to the following drawings and preferred embodiments.

DESCRIPTION OF THE DRAWINGS

In FIG. 1, (a) is the exothermicity of potassium hydroxide in water, (b) is the exothermicity of potassium hydroxide and succinic acid in water, and (c) is the exothermicity of potassium hydroxide and succinic anhydride in water.

In FIG. 2, (c) is the exothermicity of potassium hydroxide and succinic anhydride in water, (d) is the exothermicity of potassium hydroxide and succinic anhydride in aqueous propylene glycol (40:40:20 by wt.), and (e) is the exothermicity of potassium hydroxide and succinic anhydride in aqueous propylene glycol (33.3:33.3:33.3 by wt.).

In FIG. 3, (f) is the exothermicity of sodium hydroxide in water, (g) is the exothermicity of sodium hydroxide and succinic acid in water, and (h) is the exothermicity of sodium hydroxide and succinic anhydride in water.

In FIG. 4, (i) is the exothermicity of sodium hydroxide and succinic anhydride in aqueous propylene glycol (40:40:20 by wt.), and (j) is the exothermicity of sodium hydroxide and succinic anhydride in aqueous propylene glycol (33.3:33.3:33.3 by wt.).

In FIG. 5, (k) is the exothermicity of ammonium hydroxide and succinic acid in water, and (l) is the exothermicity of ammonium hydroxide and succinic anhydride in water.

In FIG. 6, Y is the rate of corrosion in $mg/cm^2$, (a) is the rate of corrosion for potassium formate, (b) is the rate of corrosion for sodium formate, (c) is the rate of corrosion for potassium acetate, (d) is the rate of corrosion for the dicarboxylic acid mixture of EP82890136.5, (e) is the rate of corrosion for potassium succinate, (f) is the rate of corrosion for a 50:50 (by wt.) mixture of potassium succinate and propylene glycol, and (g) is the rate of corrosion for a 95:5 (by wt.) mixture of potassium succinate and magnesium succinate.

In FIG. 7, Y is the rate of corrosion in $mg/cm^2$, (a) is the rate of corrosion for potassium formate, (b) is the rate of corrosion for sodium formate, (c) is the rate of corrosion for potassium acetate, (d) is the rate of corrosion for sodium acetate, (e) is the rate of corrosion for potassium succinate, (f) is the rate of corrosion for a 50:50 (by wt.) mixture of potassium succinate and propylene glycol, and (g) is the rate of weight loss allowed by AMS 1435A.

In FIG. 8, Y axis is the amount of scaled concrete in grams, (a) is the amount of scaling induced by potassium formate, (b) is the amount of scaling induced by potassium acetate, (c) is the amount of scaling induced by sodium chloride, (d) is the amount of scaling induced by potassium succinate, (e) is the amount of scaling induced by a 50:50 (by wt.) mixture of potassium succinate and propylene glycol, and (f) is the amount of scaling induced by deionized, distilled water.

In FIG. 9, Y is the amount of melted ice as grams per gram of deicer; (a) is the ice melting capacity of a 50 wt % solution of aqueous potassium succinate at the indicated temperatures; (b) is the ice melting capacity of a 50 wt % solution of a 3:2 by wt. mixture of aqueous potassium succinate at the indicated temperatures; and (c) is the ice melting capacity of a 50 wt % solution of aqueous propylene glycol at the indicated temperatures.

DETAILED DESCRIPTION OF THE INVENTION

Figure 1:
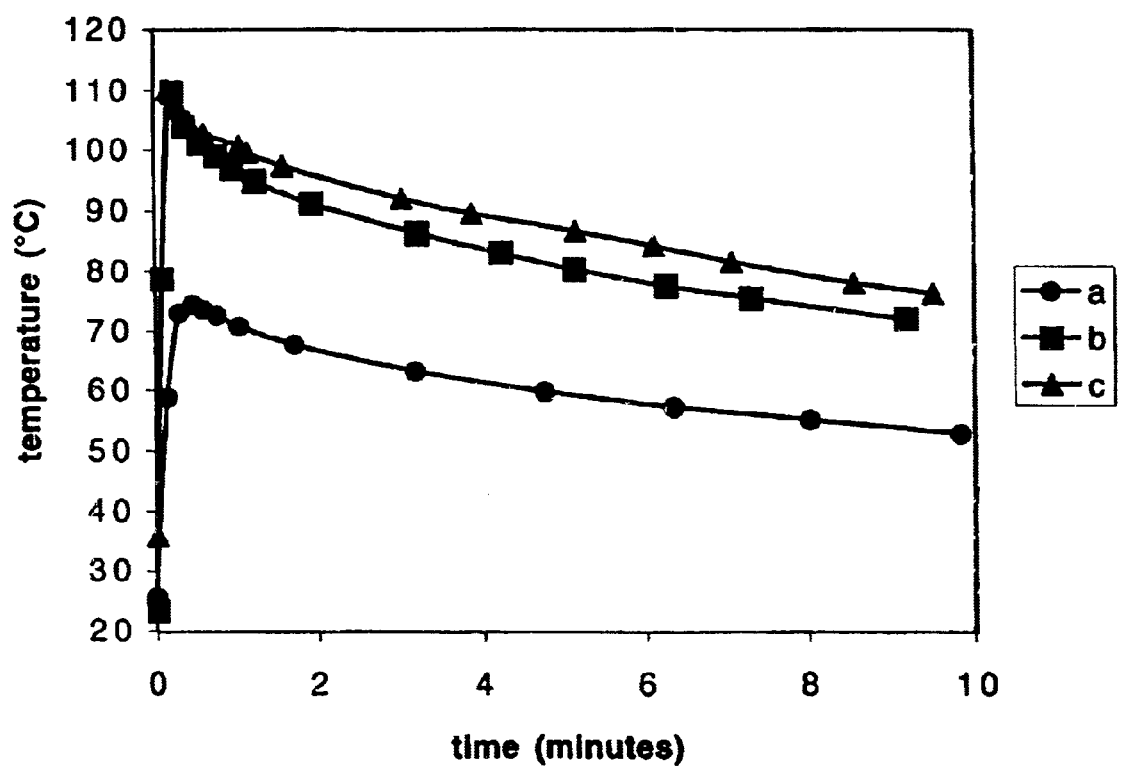
FIG. 1 shows the exothermicity of potassium succinate formation over time in aqueous media.

All patents, patent applications, government publications, government regulations, and literature references cited in this specification are hereby incorporated herein by reference in their entirety. In case of conflict, the present description, including definitions, will control.

The present invention provides dual action exothermic chemical deicing compositions and methods of application for the exothermic chemical deicing compositions on (1) airports, airbases, and commercial/military aircrafts, (2) commercial/military nautical vessels and support structures, and (3) highways, residential/commercial driveways, walkways and walking structures. The invention provides chemical formulations that include succinic acid or succinic anhydride and neutralizing bases, and optionally, proprietary corrosion inhibitors and propylene glycol. The exothermic chemical deicing compositions of the present invention undergo a heat liberating assortment of chemical reactions upon contact with water. The chemical reactions include dissolution, neutralization and hydration. As shown in the examples, the cumulative amount of heat released by the reactions is enormous and the heat that is released is accessible almost instantaneously. Both phenomena are useful for the fabrication of effective dual-action deicers.

A noteworthy aspect of this invention is that the final products of the reactions are by themselves highly effective deicers and freezing point depressants as shown in U.S. Pat. No. 6,287,480 to Berglund et al., which is assigned to common assignees. U.S. Pat. No. '480 demonstrated the feasibility of using succinate salts such as potassium, sodium and ammonium succinate as deicing chemicals. The succinate salts result in a 40% direct cost savings in comparison to calcium magnesium acetate (CMA). In aqueous media, the succinate salts are freezing point depressants which enhance the deicing/anti-icing process. Furthermore, the superior performance of succinate salts in comparison to CMA was anticipated to provide additional savings in indirect costs due to the consequent reduction in application capacities and frequencies. Succinate salts are also non corrosive and environmentally benign. Therefore, the succinate-based deicers were expected to provide reductions in maintenance costs on highway infrastructure as well as a cleaner roadside environment.

U.S. Pat. No. '480 also demonstrated that airport and airbase deicing is an extremely viable market for potassium succinate-based deicers. Airport and airbase deicers need to comply with stringent criteria. These criteria are set to protect specialty alloys used on aircrafts in structurally critical areas. U.S. Pat. No. '480 also shows that potassium succinate can be formulated to exceed the standard requirements for aircraft metals.

Currently, the deicer known as CF7, which is based on potassium acetate, manufactured by Cryotech Deicing Technology, Fort Madison, Iowa, is scheduled for testing on airports. Therefore, U.S. Pat. No. '480 to compared potassium succinate to CF7. U.S. Pat. No. '480 showed that potassium succinate is 75% less corrosive than CF7 and it is 80% less corrosive than potassium acetate, which is the main constituent of CF7. The present invention enhances the utility of the succinate salts as deicers and anti-icers by the discovery that a mixture of an acidic succinic compound with a base in an aqueous solution releases a tremendous amount of heat during the formation of succinate salts which effectively deices a surface.

In the present invention, the dissolution of a base such as potassium hydroxide or sodium hydroxide in water and the simultaneous addition of succinic acid provides two heat liberating reactions, namely the dissolution of the base and the neutralization of the acid. An aspect unique to this invention is that the substitution of succinic acid by succinic anhydride provides an additional potent heat source; namely, the hydration of succinic anhydride to produce succinic acid. Clearly, the substitution does not alter the final product that comes in to contact with iced surfaces.

Therefore, the succinate-forming compositions of the present invention provide exothermic chemical deicing compositions that are effective for removing ice from a surface and effective in preventing the re-formation of ice on the surface. The exothermic chemical deicing compositions comprise an acidic succinic compound preferably an acidic succinic compound selected from the group consisting of succinic acid, succinic anhydride, and mixtures thereof and a base, preferably a base selected from the group consisting of sodium hydroxide, potassium hydroxide, ammonium hydroxide, and mixtures thereof. In particular embodiments, the exothermic chemical deicing compositions further include corrosion inhibitors, thickeners, and compounds that inhibit formation of ice on a surface, re-freezing of the water from melted ice, or re-formation of ice on a surface in which the ice has been removed. Because of the heat that is produced by the exothermic chemical deicing compositions and the environmental friendliness of the components of the exothermic chemical deicing compositions, melting of ice on a surface can be achieved with little adverse effect on the environment.

The present invention further includes a multiplicity of embodiments for applying the exothermic chemical deicing compositions to ice on a surface to melt the ice. It would be readily apparent to one with ordinary skill in the art that the prior apparatuses for applying deicing solutions to aircraft and other surfaces can be adapted to apply the exothermic chemical deicing compositions of the present invention. For example, the apparatus disclosed in U.S. Pat. No. 5,845,848 to Amako et al., U.S. Pat. No. 4,826,107 to Thornton-Trump, U.S. Pat. No. 4,573,802 to Kerrigan et al., U.S. Pat. No. 4,191,348 to Holwerda, or U.S. Pat. No. 5,096,145 to Phillips et al. for applying deicing solutions to aircraft can be adapted to apply the exothermic chemical deicing compositions of the present inventions. The above apparatuses rely upon heaters for heating the deicing solutions. However, when the exothermic chemical deicing compositions of the present invention are used instead of the prior art deicing solutions, the heaters are no longer necessary.

In one method for applying the exothermic chemical deicing compositions of the present invention to ice on a surface, aqueous solutions of the acidic succinic compound and the base components of the exothermic chemical deicing compositions are stored separately. For a deicing application, the aqueous solutions are mixed to produce a heat-producing aqueous mixture which is applied to the ice on a surface to melt the ice. The mixing is performed in a tank and the heat-producing aqueous mixture subsequently applied to the ice on a surface. Alternatively, because the release of heat is almost instantaneous upon mixing, the aqueous solutions are simultaneously mixed and applied to the ice on the surface. This can be achieved by using a means that mixes the aqueous solutions as they are being applied to the ice on the surface. In particular embodiments, the aqueous solutions are further mixed with water before or during application.

In another method for applying the exothermic chemical deicing compositions of the present invention to ice on a surface, the acidic succinic compound and the base components of the exothermic chemical deicing compositions are stored separately but one is stored as an aqueous solution and the other is stored in a dry form. For example, the acidic succinic compound can be stored as an aqueous solution and the base stored in a dry form. For a deicing application, the aqueous solution is mixed with the dry form to produce a heat-producing aqueous mixture which is applied to the ice on a surface to melt the ice. The mixing is performed in a tank and the heat-producing aqueous mixture subsequently applied to the ice on a surface. In particular embodiments, the dry form is mixed with water to produce an aqueous solution which is then mixed with the first aqueous solution. Alternatively, because the release of heat is almost instantaneous, the aqueous solution and dry form or an aqueous solution to which the dry form has been dissolved are simultaneously mixed and applied to the ice on the surface. This can be achieved by using a means that mixes the aqueous solution and the dry form or the aqueous solution to which the dry form has been dissolved as they are being applied to the ice on the surface. In particular embodiments, the components are further mixed with water before or during application.

In a further method for applying the exothermic chemical deicing compositions of the present invention to ice on a surface, the acidic succinic compound and the base components of the exothermic chemical deicing compositions are stored as a dry blend, preferably as a powder or a granulate. Preferably, the dry blend further contains a moisture absorbing compound such as cornstarch or silica which inhibits moisture from causing the succinate-forming reaction from occurring in the dry blend during storage. For a deicing application, the dry blend is mixed with water to form a heat-producing aqueous mixture which is applied to the ice on a surface to melt the ice. The mixing is performed in a tank and the heat-producing aqueous mixture subsequently applied to the ice on a surface. Alternatively, because the release of heat is almost instantaneous, the dry blend is simultaneously mixed with water and applied to the ice on the surface. In particular embodiments, the dry blend is provided in a powder or granulated form which further includes a succinate salt. The dry blend is applied to the ice on a surface. The succinate salt begins to melt the ice and the water that is released enables the acidic succinic compound and base to react to produce heat which melts more ice which releases more water which enables more of the acidic succinic compound and base to react which produces more heat. Thus, in a short period of time, the ice on the surface is melted.

The present invention further includes exothermic chemical deicing compositions comprising one or more polyhydric alcohols. Polyhydric alcohols are particularly effective at providing resistance to re-freezing and re-formation of ice on a surface after the ice has once been melted. Examples of polyhydric alcohols are the alkylene and dialkylene glycols such as ethylene glycol, diethylene glycol, propylene glycol, and dipropylene glycol. Therefore, exothermic chemical deicing compositions comprising an acidic succinic compound such as succinic acid or succinic anhydride, or both, a base such as potassium or sodium hydroxide, and at least one polyhydric alcohol are particularly effective as both deicing and anti-icing agents when applied to a surface. Compositions comprising succinic anhydride, potassium hydroxide, and propylene glycol are particularly effective at deicing a surface and inhibiting formation of ice on a surface, re-freezing of the melted ice, or re-formation of ice on the surface after the ice has been melted.

Because of their viscosity, polyhydric alcohols are often used in deicing compositions in an amount sufficient to thicken the deicing composition to a viscosity sufficient to enable the deicing composition to cling to a surface. However, because polyhydric alcohols are toxic, in cases where it is desirable that the deicing composition cling to a surface and be environmentally friendly, a non-toxic thickener is preferred. Non-toxic thickeners include hydrophilic heteropolysaccharide colloids such as those disclosed in U.S. Pat. No. 5,772,912 to Lockyer et al. Therefore, the exothermic chemical deicing compositions of the present invention further includes embodiments comprising an acidic succinic compound such as succinic acid or succinic anhydride, or both, a base such as potassium hydroxide, sodium hydroxide, ammonium hydroxide, or mixture thereof, and an amount of polyhydric alcohol to impart a viscosity to the composition sufficient to enable the composition to cling to a surface. For environmentally friendly embodiments, the exothermic chemical deicing compositions comprise an acidic succinic compound such as succinic acid or succinic anhydride, or both, a base such as potassium hydroxide, sodium hydroxide, ammonium hydroxide, or mixture thereof, and a sufficient amount of a hydrophilic heteropolysaccharide colloid to impart a viscosity to the composition sufficient to enable it to cling to a surface.

Therefore, the exothermic chemical deicing compositions of the present invention which further comprise one or more polyhydric alcohols have both deicing and anti-icing capacities and because of the viscosity imparted to the composition by the polyhydric alcohol, the composition effectively clings to the surfaces to which it is applied which extends the time in which deicing and anti-icing activities of the composition are active on the surface. That is particularly useful for deicing and preventing ice formation on non-level surfaces such as windshields, aircraft surfaces, and roadway surfaces.

Figure 6:
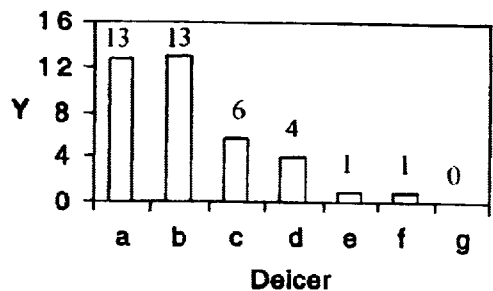
FIG. 6 shows the rate of corrosion of dichromate treated magnesium alloy in aqueous deicer solutions containing 3 wt % deicer.

Optionally further still, the exothermic chemical deicing compositions further include an effective amount of at least one corrosion inhibitor selected from the group consisting of an alkali metal polymer salt such as sodium polymaleimide salt and magnesium succinate, an alkali metal polyaspartate such as sodium polyaspartate and magnesium succinate, an alkali metal polysuccinimide such as sodium polysuccinimide, an alkali metal polyaspartate such as sodium polyaspartate and an alkali metal polymaleimide salt such as sodium polymaleimide salt, and magnesium succinate. The effectiveness of the specific corrosion inhibitors recited above is disclosed in U.S. Pat. No. 6,287,480 to Berglund et al. which also discloses that the corrosion inhibitors also enhanced the deicing capacity of deicing compositions. As shown in FIG. 6, the product of an exothermic chemical deicing composition consisting of a 3 wt % solution of a 95:5 (by wt.) mixture of succinic acid and magnesium succinate and potassium hydroxide in water caused no corrosion of dichromate treated magnesium alloys whereas prior art deicers caused substantial corrosion and the exothermic chemical deicing compositions produced minimal corrosion. Therefore, while the components of the exothermic chemical deicing compositions of the present invention are minimally corrosive to metals and concrete, the addition of corrosion inhibitors would render the exothermic chemical deicing compositions particularly useful for exothermic chemical deicing compositions intended for applications to roadway surfaces and metals such those found on bridge structures, aircraft, metal steps, motor vehicles, and the like.

In general, the exothermic chemical deicing compositions of the present invention comprise upon mixing between about 1.5 to 36.6% acidic succinic and 1.5 to 34.5% of base in water. Preferably, the acidic succinic is about 30.5% and the base is about 28.8% and the remainder is water. When the compositions comprise a polyhydric alcohol such as propylene glycol, the polyhydric alcohol is between about 0% and 25%, preferably about 25% with the remainder water. Optionally, the water can further include corrosion inhibitors and surfactants.

Figure 10:
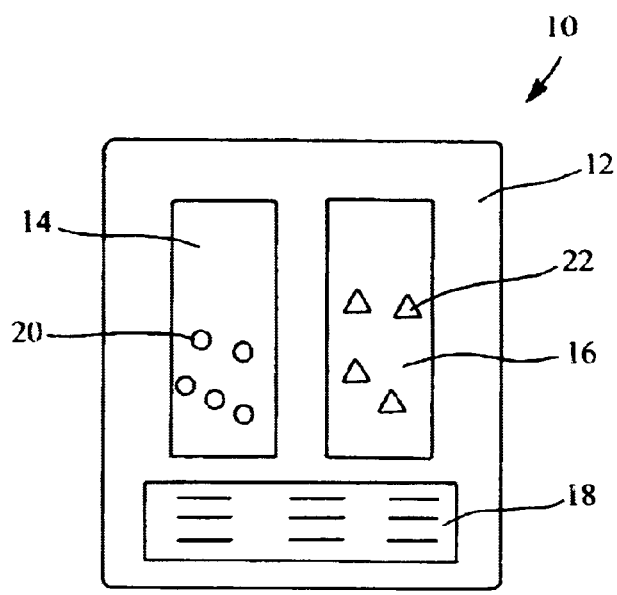
FIG. 10 shows a kit for producing the heated deicing composition of the present invention wherein the acidic succinic compound and base are in separate containers.

The exothermic chemical deicing compositions of the present invention can be provided as a kit. FIG. 10 shows one embodiment of a kit. The Figure shows kit 10 which comprises a package 12 containing a first container 14 and a second container 16, and instructions for using the kit 10. In one embodiment, container 14 contains an acidic succinic compound 20 (dry or aqueous) and container 16 contains a base 22 (dry or aqueous). Optionally, the kit can contain a third container (not shown) for containing water or aqueous polyhydric alcohol solution or for mixing the acidic succinic compound 20 and the base 22. The kit is not to be construed as being limited to the embodiment shown. For example, contemplated are embodiments wherein the containers are separated by a frangible seal similar to that shown for the warming device shown in FIG. 11 which is ruptured for mixing aqueous solutions of the acidic succinic compound and base to produce the exothermic chemical deicing composition. In further embodiments, one container contains a dry blend of the acidic succinic compound and base, preferably, the dry such as cornstarch or silica, and the other container contains water or an aqueous polyhydric alcohol solution.

In addition to providing exothermic chemical deicing solutions, the present invention provides kits for sale as a unit in producing a heated solution which are used as warming devices which include, but not limited to, hot packs for medical treatments, hand warmers, seat warmers, and food warmers. There is a conceptual precedence for such applications. For example, see U.S. Pat. No. 5,334,323 to Schrimpf. In general, the warming device comprises two compartments separated by a breakable seal; one compartment contains a dry acidic succinic compound such as succinic acid or succinic anhydride, or both, blended with a dry base such as sodium hydroxide or potassium hydroxide (preferably, the dry blend further contains a moisture absorbing compound such as cornstarch or silica) and the other compartment contains water. On demand, the seal is broken which allows contact between the dry blend and water which then react to provide a solution of the desired temperature.

Alternatively, one compartment contains an aqueous solution of an acidic succinic compound such as succinic acid or succinic anhydride and the other compartment contains an aqueous solution of a base such as sodium hydroxide or potassium hydroxide, or a dry base. On demand, the seal is broken which allows contact between the aqueous acidic succinic compound solution and the aqueous base solution or dry base which then react to provide a solution of the desired temperature.

In a further alternative, one compartment contains dry acidic succinic compound such as succinic acid or succinic anhydride and the other compartment contains an aqueous solution of a base such as sodium hydroxide or potassium hydroxide. On demand, the seal is broken which allows contact between the dry acidic succinic compound solution and the aqueous base solution which then react to provide a solution of the desired temperature.

In any one of the embodiments, the temperature of the solution upon mixing the acidic succinic compound and the base is affected by the ratio of the acidic succinic compound and the base or by the molar concentration of each. In addition, propylene glycol can be used to attenuate that exothermicity of the reaction. Therefore, by adjusting the molar concentration of the acid and base components or the ratio of the acid and base components, and further by the amount of propylene glycol, warmers are made that produce particular temperatures. By using succinic anhydride or a mixture of succinic anhydride and succinic acid, the temperature of the warmer can be made to persist at a higher temperature for a period of time that is longer than that when only succinic acid is used.

Figure 11:
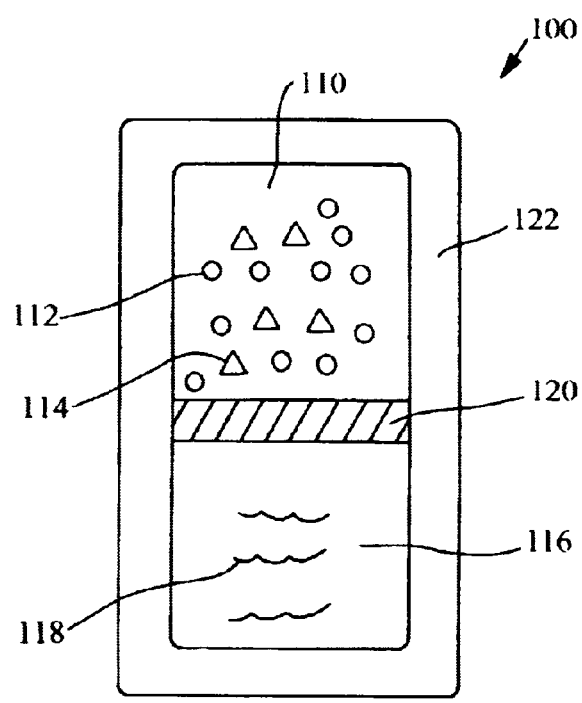
FIG. 11 shows a warming device 100 for producing heat comprising a first compartment 110 for containing a dry blend of an acidic succinic compound 112 and base 114 separated from a second compartment 112 containing water 118 the base by a frangible seal 120 (cross-hatched).

FIG. 11 illustrates an embodiment of a warming device wherein the warming device 100 comprises a first compartment 110 containing a blend of a dry succinic compound 112 and a dry base 114 which is separated from a second compartment 116 containing water 118. The first compartment 110 is separated from the second compartment 116 by a frangible seal 120. In general, the warming device 100 is flexible and manufactured from a thermoplastic polymer in which case the compartments are defined by hard seal 122 and the frangible seal 120. The illustrated warming device is adaptable to any one of the above recited embodiments.

The thermoplastic polymers used in the warming devices are well known to those skilled in the art. The polymers can be natural or synthetic. Sometimes the term "thermoplastic resins" is used in the art for "thermoplastic polymers" and it is intended that they be treated the same. The thermoplastic polymers are contrasted with "thermoset" polymers which decompose but do not soften upon heating. However, there are numerous hybrid and mixed polymers which are the equivalent of the thermoplastic polymers for the purpose of the present invention. Examples of polymers that can be used to make the warming device include, but are not limited to, the polyalkylene oxide polymers (polyethylene, polypropylene, and polybutylene), the terphthalate polymers (PET), and polyolefins, such as vinyl resins such as vinyl acetate, vinyl chloride, and styrene.

The following examples are intended to promote a further understanding of the present invention.

EXAMPLE 1

This example shows that the exothermic chemical deicing compositions of the present invention release a large amount of heat and the heat which is released is released almost instantaneously upon mixing the acidic succinic and base components of the compositions.

All experiments in this example were conducted in an insulated and covered beaker that was placed on a magnetic stirrer. The temperature was monitored by a thermocouple dipped into the beaker. Depending on the objective of the experiment, the procedure was as follows. A measured amount of any one of the following placed in the beaker: (a) water; (b) water and propylene glycol; and, (c) in the case of experiments conducted with ammonium hydroxide as the base for neutralization, 30 wt % aqueous ammonium hydroxide solution. The initial temperature of the solution in the beaker was noted.

Then, depending on the objective of the experiment, a measured amount of any one of the following was added to the stirrer solution in the beaker: (a) dry base; (b) a dry blend comprised of succinic acid and base; (c) a dry blend comprised of succinic anhydride and base; and (d) in the case of experiments conducted with ammonium hydroxide as the base for neutralization, either succinic acid or succinic anhydride. The temperature of the stirred solution was monitored for 10 minutes. The makeup of each experiment is given below.

Stoichiometric quantities of acid, anhydride and base, computed based on the concentration of the target succinate solution, were used: (a) quantitative equivalence of base used to neutralize the acid (11.5 g of potassium hydroxide, and 20 g of water); (b) 50 wt % aqueous potassium succinate solution (12.2 g of succinic acid, 11.5 g of potassium hydroxide, and 16.3 g of water); (c) 50 wt % aqueous potassium succinate solution (10.3 g of succinic anhydride, 11.5 g potassium hydroxide, and 18.1 g of water); (d) potassium succinate .water propylene glycol (40:40:20 by wt.) (10.3 g of succinic anhydride, 11.5 g of potassium hydroxide, 18.1 g of water, and 10 g of propylene glycol);

(e) potassium succinate:water:propylene glycol (33.3:33.3:33.3 by wt.) (10.3 g of succinic anhydride, 11.5 g of potassium hydroxide, 18.1 g of water, and 20 g of propylene glycol); (f) quantitative equivalence of sodium hydroxide used to neutralize the acid (9.9 g of sodium hydroxide, and 20 g of water); (g) 50 wt % aqueous sodium succinate solution (14.6 g of succinic acid, 9.9 g of sodium hydroxide, and 15.6 g of water); (h) 50 wt % aqueous sodium succinate solution (12.3 g of succinic anhydride, 9.9 g sodium hydroxide, and 17.8 g of water); (i) sodium succinate:water:propylene glycol (40:50:10 by wt.) (14.6 g of succinic acid, 9.9 g of sodium hydroxide, 20.6 g of water, and 5 g of propylene glycol); (j) sodium succinate :water :propylene glycol (40:50:10 by wt.) (12.3 g of succinic anhydride, 9.9 g of sodium hydroxide, 22.8 g of water, and 5 g of propylene glycol); (k) 43.3 wt % aqueous ammonium succinate solution (15.5 g of succinic acid and 30.7 g of 30 wt % aqueous ammonium hydroxide solution); and (l) 45.6 wt % aqueous ammonium succinate solution (13.2 g of succinic anhydride and 30.7 g of 30 wt % aqueous ammonium hydroxide solution).

The following data demonstrate the extraordinary, cumulative exothermicity of base dissolution, acid neutralization and anhydride hydration of the exothermic chemical deicing compositions of the present invention. The exothermicity of potassium succinate formation in aqueous media is presented in FIG. 1. The profile of the heat of dissolution of potassium hydroxide in water (a) was used for reference purposes. The exothermicity of succinic acid neutralization (b) and the cumulative exothermicity of simultaneous succinic anhydride hydration and succinic acid neutralization (a) drove the resulting potassium succinate solution to its boiling point almost instantaneously. The approximate temperature gradient was 7.2° C./second. The additional heat output by succinic anhydride hydration was not evident because succinic acid neutralization by potassium hydroxide alone drove the solution to its boiling point rapidly. However, the cooling portion of the temperature profile of the succinic anhydride experiment (a) points to the presence of an additional heat source when succinic acid is substituted with succinic anhydride. The temperature profile was noticeably higher for succinic anhydride than that it was for succinic acid. Nevertheless, the potential of this method for rapid deployment of heat for either deicing or warming applications is clear.

Figure 2:
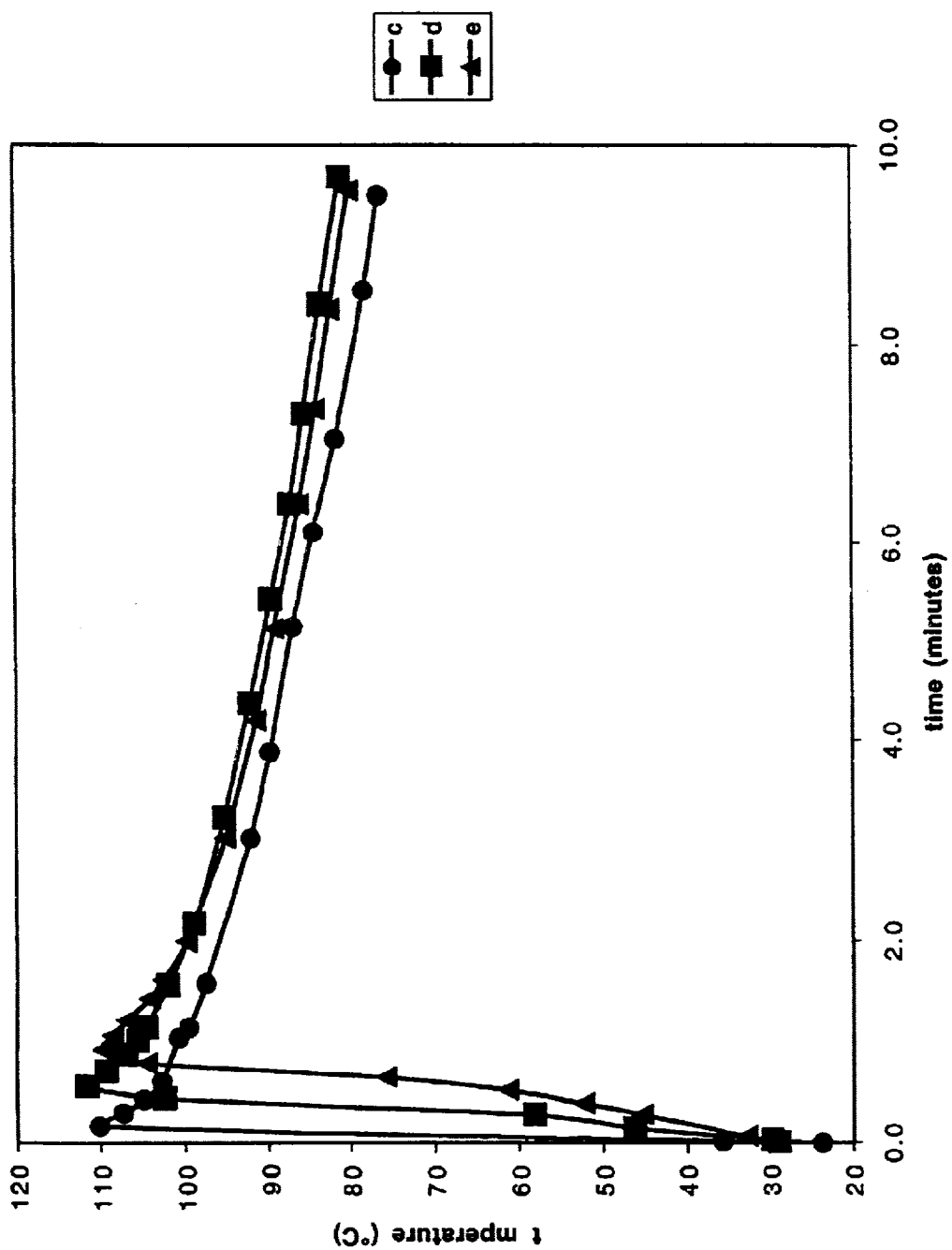
FIG. 2 shows the exothermicity of potassium succinate formation over time in aqueous propylene glycol media.

If it is desired to have more control of the heat output of these reactions, control of the heat output can be accomplished by diluting the aqueous solution by the addition of propylene glycol. The data in FIG. 2 demonstrates that the exothermicity can be attenuated by dilution with propylene glycol. In this set of experiments, the targeted potassium succinate concentration was progressively diluted by the addition of propylene glycol. FIG. 2 presents exotherms of potassium succinate formation in aqueous propylene glycol media. Clearly, the dilution by propylene glycol attenuated the exothermic propensity of the three reactions. The approximate gradients for the exotherms of experiments (c), (d), and (e) were 7.2° C./second, 1.9° C./second, and 1.5° C./second, respectively. Consequently, based on the demands of individual applications, the heat output can be regulated.

Figure 3:
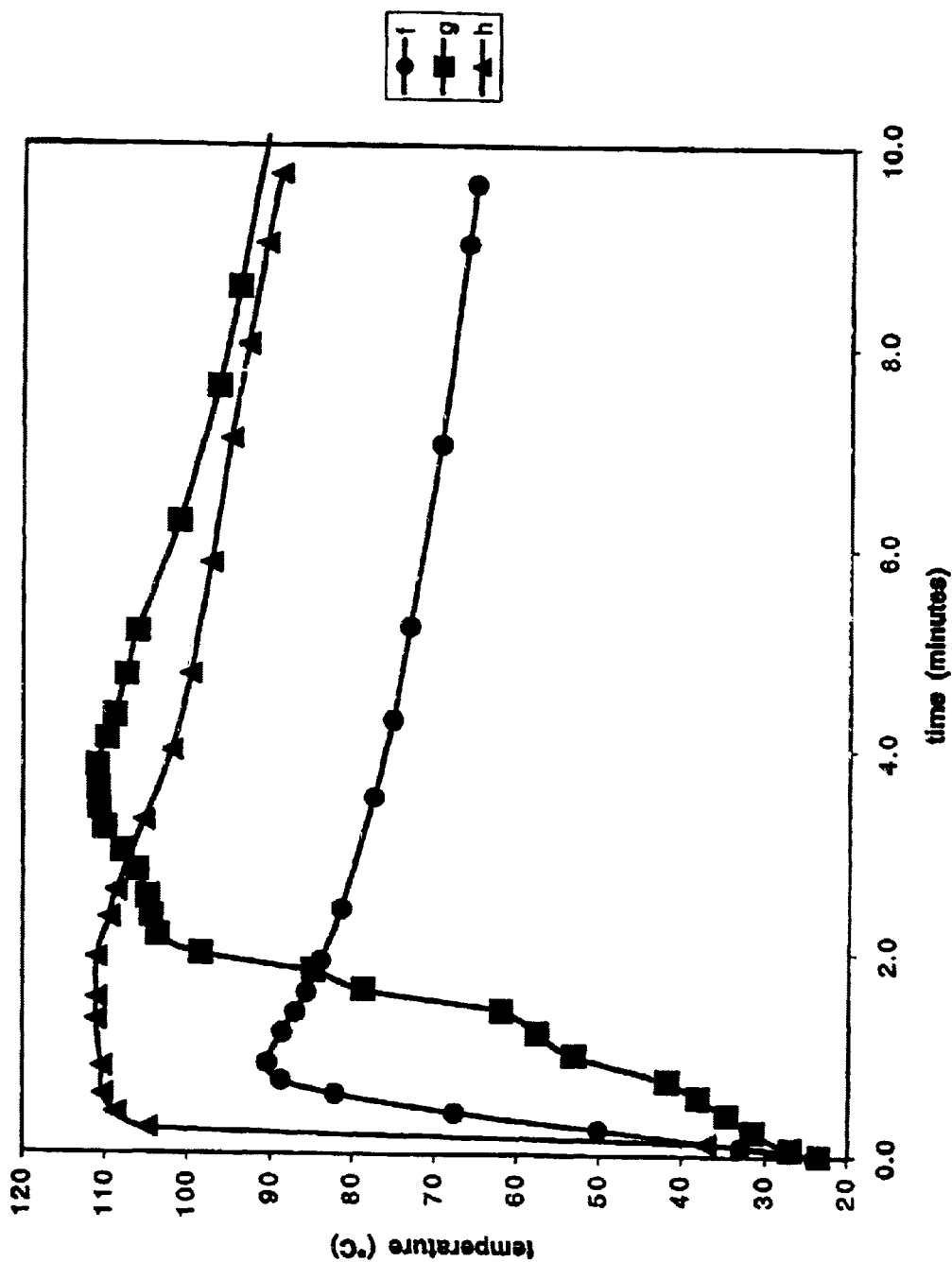
FIG. 3 shows the exothermicity of sodium succinate formation over time in aqueous media.

Similar results were observed with formation of sodium succinate in aqueous and aqueous propylene glycol media. The results of sodium succinate formation in aqueous media are presented in FIG. 3. The profile of the heat of dissolution of sodium hydroxide in water (f) was used for reference purposes. This set of data demonstrates the distinct advantage of succinic acid over other carboxylic acids—acetic (Miller, Ways to Help Bridges and Deicers Coexist: CMA Cuts Corrosion on Zilwaukee Bridge, Better Roads, (February 1993); Strawn, CMA has Role to Play in Critical Applications, Kuennen, Ed., Roads & Bridges, (March 1993)), adipic, and glutaric (EP82890136.5 to Kaes)—that have been used or proposed for deicing applications. Succinic acid is unique, in that it can easily be substituted by its anhydride, which provides an additional heat source by way of anhydride hydration. Neutralizing succinic acid to sodium succinate with sodium hydroxide in aqueous media (g) drove the resulting sodium succinate solution to its boiling point in about four minutes. The incorporation of the supplementary heat source by substituting succinic anhydride for succinic acid (b) drove the solution to its boiling point nearly instantaneously. This remarkable attribute affords a great degree of control on heat output appropriate for numerous deicing and warming applications. Desired control can be achieved by suitable succinic acid and succinic anhydride blends. Solubility of sodium succinate in water is less than 50 wt % at ambient conditions; therefore, sodium succinate solutions crystallize upon cooling. This does not affect its performance because it is readily soluble at high temperatures which allow the consumption and, therefore, full utilization of the ingredients.

Figure 4:
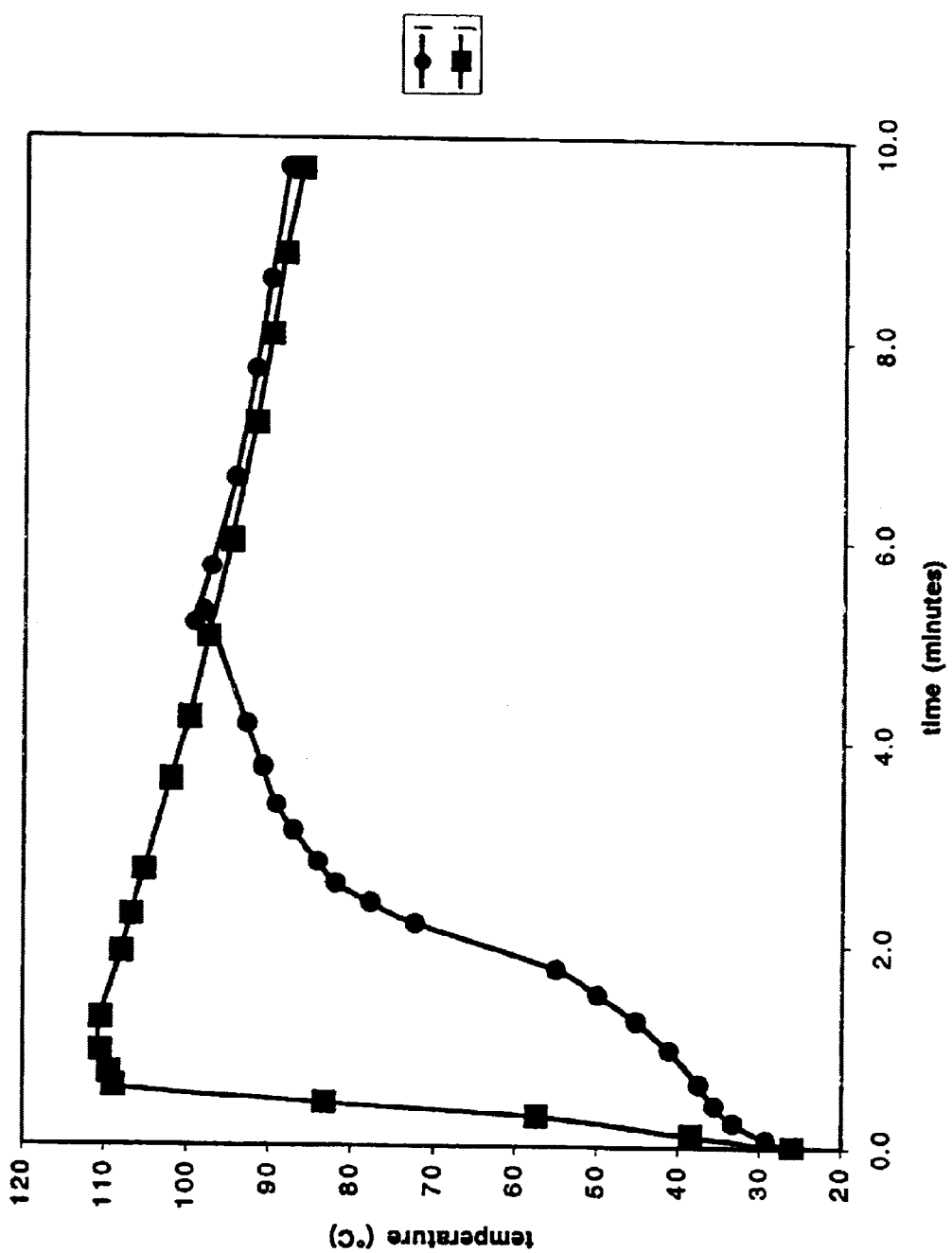
FIG. 4 shows the exothermicity of sodium succinate formation over time in aqueous propylene glycol media.

As in the case with potassium succinate solutions, additional control can be realized by using aqueous propylene glycol media with the acid neutralization. The exotherms for sodium succinate formation in aqueous propylene glycol media are presented in FIG. 4. Due to the rapidity of heat generated by succinic anhydride hydration (j) the sodium succinate solution was driven to its boiling point nearly instantaneously. On the other hand, succinic acid neutralization by sodium hydroxide in aqueous media (i) took about 5.5 minutes to drive the same solution to its boiling point. In this set of experiments, it was observed that approximately 0.5 g of sodium hydroxide remained unspent at the boiling temperature. This can be easily corrected by a slight reduction in the succinate:water ratio for sodium succinate solutions to achieve full utilization of the ingredients. Using lower concentrations to control the heat output is also be a feasible alternative. However, particularly in the case of formulating deicers, this approach can turn out to be counterproductive. The objective of the present invention is to formulate dual-action deicers that use the heat for short term ice-penetration and ice-melting and use the concentration driven freezing point depressant effect for long term anti-icing. The use of lower concentrations can compromise the long term anti-icing performance.

Figure 5:
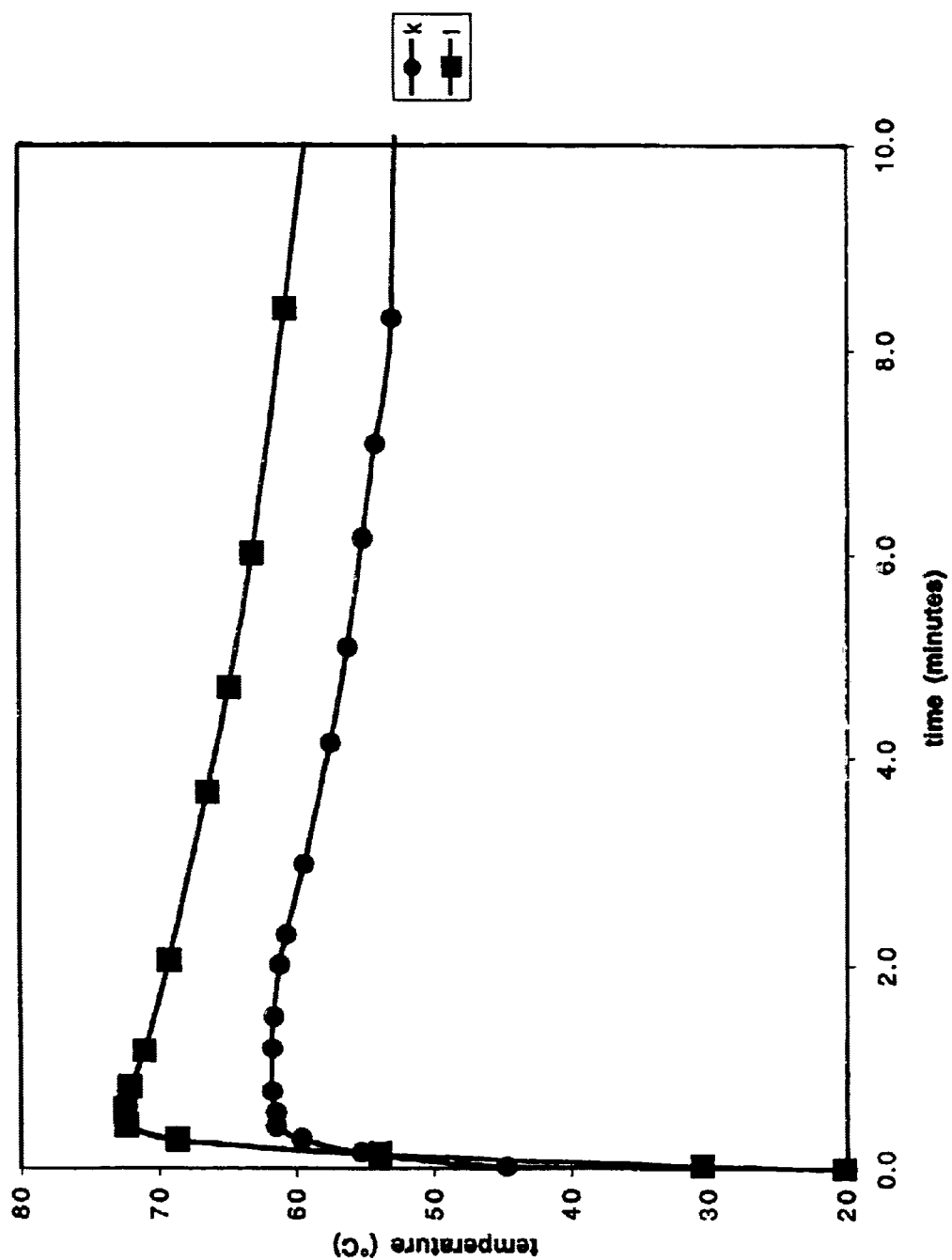
FIG. 5 shows the exothermicity of ammonium succinate formation over time in aqueous media.

Formation of ammonium succinate was studied. Since ammonium hydroxide is commercially available as an aqueous solution, only acid neutralization and anhydride hydration could be utilized as heat sources. The data are presented in FIG. 5. The data demonstrate that compared to the amount of heat that was liberated by the hydration of succinic acid with ammonium hydroxide (k), a significant amount of additional heat was liberated by the hydration of succinic anhydride with ammonium hydroxide (l).

EXAMPLE 2

This example shows that the succinate-salt containing products of the exothermic chemical deicing compositions of the present invention (both aqueous potassium succinate and mixtures of aqueous potassium succinate with propylene glycol) comply with Federal Aviation Administration (FAA) approved specification SAE AMS 1435 A.

For a deicer composition to be acceptable for use on or around aircraft, the deicer composition must comply with AMS 1435 A. In testing the compliance of the exothermic chemical deicing compositions of the present invention with AMS 1435 A, the performance and safety of the exothermic chemical deicing compositions of the present invention were also compared to the performance and safety of the acetate- and formate-based deicers which are currently being used at airports. AMS 1535 A includes the individual ASTM tests recited in Table 1.

TABLE 1

ASTM Tests for Compliance with ASM 1435 A

1. Flash point (ASTM D 93)
2. Specific gravity (ASTM D 891)
3. pH (ASTM E 70)
4. Freezing point (ASTM D 1177)
5. Sandwich corrosion (ASTM F 1110)
6. Total Immersion corrosion (ASTM F 483)
7. Low-embrittling cadmium plate (ASTM F 1111)
8. Hydrogen embrittlement (ASTM F 519)
9. Stress-corrosion resistance (ASTM F 945)
10. Effect on transparent plastic (ASTM F 484)
11. Effect on painted surfaces (ASTM F 502)
12. Effect on unpainted surfaces (ASTM F 485)
13. Rinsibility (ASTM F 1105)
14. Runway concrete scaling resistance (ASTM C 672)
15. Storage stability (ASTM F 1105)
16. Performance (improved SHRP H-205.1 protocol)

Tests 1, 8, and 9 were not conducted. They can be carried out at a certified laboratory. Test 13 was trivial and was not carried out methodically. Test 15 requires a period of at least 12 months storage and testing.

Specific Gravity (ASTM D 891)

The AMS 1435 A recommends that ASTM D 891 be used for measuring the specific gravity of aircraft wing deicers. The two methods available for testing specific gravity are the hydrometer method and the pycnometer method. Although the hydrometer method is less accurate, it is often satisfactory for many purposes unless the sample is too viscous to permit the hydrometer to float freely. The hydrometer method was determined to be satisfactory for measuring the specific gravity of the succinate salt-containing products of the exothermic chemical deicing compositions of the present invention. The measurements were made following the ASTM D 891 protocol at 20° C. using an Ertico hydrometer graduated from 1.0 to 2.0 in 0.01 increments. The results are presented in Table 2 ($ddH_2O$ is deionized, distilled water).

TABLE 2

| Sample (K succinate:propylene glycol:$ddH_2O$) | Specific gravity |
|---|---|
| $ddH_2O$ | 1.00 |
| 20:30:00 by wt. | 1.12 |
| 25:25:00 by wt. | 1.15 |
| 30:20:00 by wt. | 1.18 | pH (ASTM E 70)

The pHs of the succinate salt-containing products of the exothermic chemical deicing compositions of the present invention comply with the requirement set by AMS 1435 A when measured using the AMS 1435 A recommended ASTM E 70 protocol.

AMS 1435 recommends that ASTM E 70 be used for measuring the pH of aircraft wing deicers. A glass electrode is used for this method. The pH of the succinate salt-containing products of the exothermic chemical deicing compositions including propylene glycol was measured at 20° C. using a Corning 313 pH/Temperature meter with a resolution of 0.01. The ASTM 1435 A requires the pH to be between 7.0 and 11.5 and within ±0.5. The data presented in Table 3 shows that the succinate salt-containing products of the exothermic chemical deicing compositions of the present invention comply with the requirement.

TABLE 3

| Sample (K succinate:propylene glycol:$ddH_2O$) | pH |
|---|---|
| $ddH_2O$ | 6.60 |
| 20:30:00 by wt. | 9.98 |
| 25:25:00 by wt. | 10.08 |
| 30:20:00 by wt. | 10.12 |

Freezing Point (ASTM D 1177)

The freezing points of the succinate salt-containing products of the exothermic chemical deicing compositions of the present invention satisfy the freezing point requirements of AMS 1435 A when measured using the AMS 1435 A recommended ASTM D 1177 protocol.

According to AMS 1435 A, the freezing point of deicing fluids diluted 1:1 by weight with deionized and distilled water should be lower than −14.5° C. The freezing point results for the succinate salt-containing products of the exothermic chemical deicing compositions of the present invention are presented in Table 4.

In Table 4, the freezing points for the succinate salt-containing products of the exothermic chemical deicing compositions were compared to the freezing point of formate- and acetate-based deicers which are currently being used in airport deicing applications. The freezing point of the succinate salt-containing products of the exothermic chemical deicing compositions are higher than the formate- and acetate-based deicers but are still within the requirements of AMS 1435 A. Furthermore, as demonstrated below, while the freezing point of the succinate salt-containing products of the exothermic chemical deicing compositions are higher than those currently being used, the exothermic chemical deicing compositions are substantially less corrosive and, therefore, are safer than the current deicers.

TABLE 4

| Deicer | Freezing Point (° C.) |
|---|---|
| Potassium formate | −50.8 |
| Potassium acetate | −51.8 |
| Potassium succinate | −26.8 |
| Potassium succinate:propylene glycol (1:1) | −34.5 |

Sandwich Corrosion (ASTM F 1110)

The corrosive effects of the succinate salt-containing products of the exothermic chemical deicing compositions of the present invention on aluminum having a clad or anodized surface are within the limits set by AMS 1435 A when measured using the AMS 1435 A recommended ASTM F 1110 protocol.

ASTM F 1110 is a comparative environmental test for the corrosivity of liquid or solid deicers on structural aluminum used in aircraft construction. In this test, a piece of Whatman GFA glass fiber filter paper was saturated with an aqueous deicer solution and sandwiched between two aluminum coupons. Subsequently, the sandwiched sets of aluminum were placed in a forced-air oven for 8 hours at 37±2.8° C. (100±5° F.) followed by 16 hours in a humidity cabinet maintained at 37±1° C. (100±2° F.) and 95 to 100% relative humidity. That completed one cycle. The above cycle was repeated seven times over seven days. The test results were evaluated by comparison of the appearance of the facing surfaces of the sets of aluminum coupons. A relative corrosion severity rating system was used for numerically classifying the test results. The rating system eliminated the need for elaborate weight loss measurements. The relative corrosion severity rating system is (0) no visible corrosion; (1) very slight corrosion or discoloration (up to 5% of the surface corroded; (2) sight corrosion (5 to 10% of the surface corroded); (3) moderate corrosion (10 to 25% of the surface corroded); and, (4) extensive corrosion or pitting (25% or more of the surface corroded).

The results from the corrosion test were not conclusive. It was difficult to categorically assign the observed surface conditions to either surface discoloration or corrosion. Nevertheless, the succinate salt-containing products of the exothermic chemical deicing compositions of the present invention resulted in minimal surface discoloration on both clad and anodized non-clad aluminum. In fact, while the succinate salt-containing products of the exothermic chemical deicing compositions of the present invention did not cause any discoloration, both the formates and acetates caused extensive surface discoloration. However, it was not clear whether the discoloration was due to corrosion.

Total Immersion Corrosion (ASTM F 483)

The corrosive effects of the succinate salt-containing products of the exothermic chemical deicing compositions of the present invention on aircraft alloys are within the limits set by AMS 1435 A when measured using the AMS 1435 A recommended ASTM F 483 protocol.

Many aircraft metal alloys are subjected to the Total Immersion Corrosion test (ASTM F 483). This test covers aircraft alloys such as the anodized AMS 4037 Aluminum alloy, AMS 4041 aluminum alloy, AMS 4049 aluminum alloy, dichromate treated AMS 4376 magnesium alloy, AMS 4911 titanium alloy, and AMS 5045 carbon steel. As was shown in U.S. Pat. No. 6,287,480 to Berglund et al., potassium succinate conformed with the standards. It was well within the allowable corrosion limits for the above aluminum, titanium, and steel alloys.

Among the aircraft alloys, the dichromate treated AMS 4376 magnesium alloy is the most vulnerable to deicer-induced corrosion. As such, the rate of corrosion of the dichromate treated AMS 4376 magnesium alloy by the succinate salt-containing products of the exothermic chemical deicing compositions of the present invention were compared to the rate of corrosion by several formate- and acetate-based deicers of the prior art.

Formates and acetates have been targeted for airport runway deicing markets, particularly in Europe. For example, EP82890136.5 to Kaes disclosed that a dicarboxylic acid mixture consisting of 30 to 35 wt % adipic acid, 40 to 50 wt % glutaric acid, and 20 to 25 wt % succinic acid in the form of potash salt was suitable for airport deicing. Therefore, the potassium succinate mixtures of the present invention were compared to the formate- and acetate-based deicers and the dicarboxylic acid deicer formulations in EP82890136.5. The total immersion test consisted of submerging the magnesium alloy in a 3 wt % aqueous deicer solution over a 24 hour period.

As shown in FIG. 6, the succinate salt-containing products of the exothermic chemical deicing compositions of the present invention (e, f, and g) were the least corrosive of the deicers. Potassium succinate (e) was 92% less corrosive than the formate-based deicers (a and b), 83% less corrosive than the acetate-based deicer (c), and 75% less corrosive than the dicarboxylic acid-based deicer (d). The presence of propylene glycol (50:50 by wt. mixture of potassium succinate:propylene glycol) did not affect the corrosiveness of the potassium succinate (f). Unexpectedly, it was discovered that the presence of magnesium succinate (95:5 by wt. mixture of potassium succinate:magnesium succinate) completely eliminated corrosion of the magnesium alloy (g). The results unequivocally demonstrate that the succinate salt-containing products of the exothermic chemical deicing compositions of the present invention are substantially less corrosive and thus, are substantially safer than the prior art deicers for aircraft ground or wing deicing applications.

The effect of the succinate salt-containing products of the exothermic chemical deicing compositions of the present invention on the other aircraft alloys are presented in Table 5 which shows that the potassium succinate containing products of the exothermic chemical deicing compositions are well within the allowable corrosion limits for all the aluminum, titanium, and steel alloys.

TABLE 5

Results of the Total Immersion Corrosion Test

| Test Panel | Weight Change ($mg/cm^2/24$ hr) | |
| --- | --- | --- |
|  | Allowable | Observed |
| Anodized AMS 4037 Al alloy | 0.3 | 0.02 |
| AMS 4041 Al alloy | 0.3 | 0.01 |
| AMS 4049 Al alloy | 0.3 | 0.01 |
| AMS 4911 Ti alloy | 0.1 | <0.01 |
| AMS 5045 carbon steel | 0.8 | 0.43 |

Low-Embrittling Cadmium Plate (ASTM F 1111)

The adverse effects of the succinate salt-containing products of the exothermic chemical deicing compositions of the present invention on low-embrittling cadmium plates are within the limits set by AMS 1435 A when measured using the AMS 1435 A recommended ASTM F 1111 protocol. ASTM F 1111 recommends that test panels which are coated with low-embrittling cadmium plated 4130 steel not show a weight change greater than 0.3 $mg/cm^2$ per 24 hours.

Figure 7:
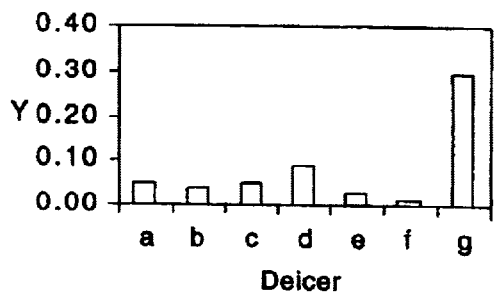
FIG. 7 shows the rate of corrosion of low-embrittling cadmium plated 1430 steel corrosion in aqueous deicer solutions containing 50 wt % deicer at 350 C.

As shown in FIG. 7, all of the deicing solutions (prior art and the succinate salt-containing products of the exothermic chemical deicing compositions of the present invention) were well within the allowable limit shown in (g). However, there were substantial differences in surface effects between the potassium succinate mixtures (e and f) and the prior art deicers (a, b, c, and d). Specifically, the potassium succinate (e) and the 50:50 by wt. mixture of potassium succinate:propylene glycol (f) had no apparent effect on the surface of cadmium-plated steel whereas the formate-and acetate-based deicers (a, b, c, and d) caused up to 30 clearly distinguishable and distinct pits on the cadmium-plated steel surface.

Effect on Transparent Plastic (ASTM F 484)

The crazing effects of the succinate salt-containing products of the exothermic chemical deicing compositions of the present invention on transparent plastics are within the limits set by AMS 1435 A when measured using the AMS 1435 A recommended ASTM F 484 protocol which measures stress crazing of acrylic plastics in contact with liquid or semi-liquid compounds.

The prior art deicers and the succinate salt-containing products of the exothermic chemical deicing compositions of the present invention were tested for crazing effects on three acrylic plastics (MIL-P-5425, MIL-P-8184, and MIL- P-25690) undergoing bending stress (outer fiber stresses up to 314.46 Kg/cm (4500 psi). Neither the prior art deicers nor the succinate salt-containing products of the exothermic chemical deicing compositions of the present invention had any apparent effect on any of the acrylic plastics undergoing bending stress.

Effect on Painted Surfaces (ASTM F 502)

The adverse effects of the succinate salt-containing products of the exothermic chemical deicing compositions of the present invention on painted aircraft surfaces are within the limits set by AMS 1435 A when measured using the AMS 1435 A recommended ASTM F 502 protocol.

The succinate salt-containing products of the exothermic chemical deicing compositions of the present invention were tested for an adverse effect on painted aircraft surfaces. During the test, half of a painted panel was exposed to a deicer solution and subsequently the exposed and unexposed areas of the panel were each etched in one stroke with pencils of varying hardness. The objective of the test was to determine the hardness of the pencil that causes the exposed paint to rupture relative to the unexposed paint. Pencil hardness in ascending order was 6B, 5B, 4B, 3B, B, HB, F, H, 2H, 4H, and 6H. The results are presented in Table 6 which shows that the succinate salt-containing products of the exothermic chemical deicing compositions of the present invention had no effect on aircraft painted surfaces while the formate and acetate deicers tended to soften the paint by one pencil hardness level.

TABLE 6

The Effect of Deicer Solutions on Painted Aircraft Surfaces

| Aqueous deicer solution | Pencil hardness to rupture | |
|---|---|---|
| (50% wt) | Unexposed | Exposed |
| Potassium succinate: propylene glycol (1:1 by wt.) | F | F |
| Potassium succinate | F | F |
| Potassium acetate | F | HB |
| Potassium formate | F | HB |
| Sodium formate | F | HB |
| Sodium acetate (20% wt) | F | HB |

Effect on Unpainted Surfaces (ASTM F 485)

The adverse effects of the succinate salt-containing products of the exothermic chemical deicing compositions of the present invention on unpainted aircraft surfaces are within the limits set by AMS 1435 A when measured using the AMS 1435 A recommended ASTM F 485 protocol.

The effect of the succinate salt-containing products of the exothermic chemical deicing compositions of the present invention were evaluated for an adverse effect on unpainted aircraft surfaces. In this test, panels consisting of titanium 6A14V conforming to MIL-T-9046 and aluminum 7075-T6 alclad conforming to federal specification QQ-A-250/13 were soaked in the potassium succinate mixtures or the prior art deicers for a short period of time. Afterwards, the panels were allowed to dry at an elevated temperature and then were visually examined for the presence of any residue or stain. The results presented in Table 7 show that neither the succinate salt-containing products of the exothermic chemical deicing compositions of the present invention nor the prior art deicers had much effect on unpainted aircraft surfaces.

TABLE 7

The Effect of Deicer Solutions on Unpainted Surfaces

| Aqueous deicer solution (50% wt) | Aluminum 7075-T6 | Titanium 6A14V |
|---|---|---|
| Potassium succinate: propylene glycol (1:1 by wt.) | No stain | No stain |
| Potassium succinate | No stain | No stain |
| Potassium acetate | No stain | No stain |
| Potassium formate | No stain | Stained |
| Sodium formate | No stain | Stained |
| Sodium acetate (25% wt) | No stain | No stain |

Runway Concrete Scaling Resistance (ASTM C 672)

The rate of runway concrete scaling resistance induced by the succinate salt-containing products of the exothermic chemical deicing compositions of the present invention are within the limits set by AMS 1435 A when using the AMS 1435 A recommended ASTM C 672 protocol.

Figure 8:
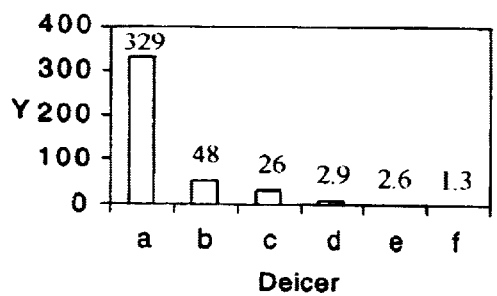
FIG. 8 shows the effect of aqueous deicers on concrete. The cumulative scaled concrete was measured in grams after 50 freeze-thaw cycles.

The rate of concrete scaling induced by the succinate salt-containing products of the exothermic chemical deicing compositions of the present invention was compared to the rate induced by the prior art deicers using ASTM C 672. The cumulative scaled concrete, measured in grams, after 50 freeze-thaw cycles is shown in FIG. 8. As FIG. 8 shows, the succinate salt-containing products of the exothermic chemical deicing compositions of the present invention caused significantly less scaling than the prior art deicers. The potassium formate deicer (a) induced 11,245% more concrete scaling than did the potassium succinate (d) and the potassium acetate (b) induced 1,555% more concrete scaling than did the potassium succinate (d) or the 50:50 mixture of potassium succinate and propylene glycol (e).

Although water soluble salts of formic acid and acetic acid have been introduced to the aircraft ground deicing market, the amount of concrete scaling induced by them is significantly higher than that induced by sodium chloride (c), which is considered unsafe for airports. Concrete scaling by the potassium succinate products of the exothermic chemical deicing compositions of the present invention (d) and (e) were equivalent to that induced by deionized water (f).

Performance (improved SHRP H-205.1 protocol)

The performance of the exothermic chemical deicing compositions of the present invention satisfy the performance requirements of AMS 1435 A when measured using the SHRP H-205.1 protocol of the "Handbook of Test Methods for Evaluating Chemical Deicers," SHRP-H/WP-90, Strategic Highway Research Program, National Science Counsel, Washington, D.C. (1992).

According to AMS 1435 A, the deicing fluid must remove accumulated frozen deposits of frost and ice from airport taxiways and runways and that acceptance criteria and method must be agreed upon by purchaser and vendor. Therefore, the SHRP H-205.1 protocol from the Handbook of methods for Evaluating Chemical Deicers was followed which specifies that the ice-melting capacity of a deicer is a measure of the pool of melted ice contained in a define volume per gram of solid deicer. The test used herein is an improvement over the SHRP H-205.1 protocol. The steps of the test consisted of (1) placing 20 g of distilled, deionized water in an 88×13 mm petri dish and freezing the water to an ice sheet at a predetermined temperature: −50° C., −10° C., −15° C., and −20° C.; (2) leveling the ice sheet with the aid of an aluminum blade to facilitate an even melting front and re-freezing; (3) storing a sample of 61.7 mg of the salt in solid form in a refrigerator at 4 to 5° C.; (4) placing 10 g of the aqueous deicer on the frozen ice sheet; (5) measuring the weight of the melted ice by subtracting the weight of the added aqueous deicer by the total weight of the solution after a predetermined time: 2, 5, 10 minutes, and so on until the ice was melted; and (6) performing the test in duplicate for each deicer composition.

The exothermic chemical deicing compositions of the present invention take advantage of the exothermicity of the heat-liberating assortment of chemical reactions that occur during the formation of aqueous potassium succinate in the formulation of the highly effective dual action deicers of the present invention. As shown in FIG. 1, the exothermicity of succinic acid neutralization (b) and the cumulative exothermicity of simultaneous succinic anhydride hydration and succinic acid neutralization (c) drove the resulting potassium succinate solution to its boiling point (108 to 110° C.) almost instantaneously with an approximate temperature gradient was about 7.2° C./second. The profile of the heat of dissolution of potassium hydroxide in water (a) is for reference purposes. The additional heat output by succinic anhydride hydration (c) was not evident because the succinic acid neutralization by potassium hydroxide alone drove the solution to its boiling point rapidly. However, the cooling portion of the temperature profile points to the presence of an additional heat source when the succinic acid was replaced by succinic anhydride because it was noticeably higher for succinic hydride than for succinic acid. As FIG. 1 shows, the potassium succinate deicers of the present invention enable the rapid deployment of heat for deicing.

The ice melting capacity of potassium succinate prepared by mixing succinic acid, potassium hydroxide, water, and propylene glycol was also measured. The propylene glycol was incorporated to provide anti-icing capacity to the succinate deicers. Therefore, aqueous solutions containing potassium succinate were prepared by mixing potassium hydroxide, succinic acid, and water with or without propylene glycol. The resulting hot aqueous solutions (105 to 108° C.) were placed on frozen ice sheets for measurement of the ice melting capacity of the aqueous solutions. The ice melting capacity of aqueous potassium succinate containing propylene glycol was compared to propylene glycol, which is currently the primary aircraft wing deicer.

Figure 9:
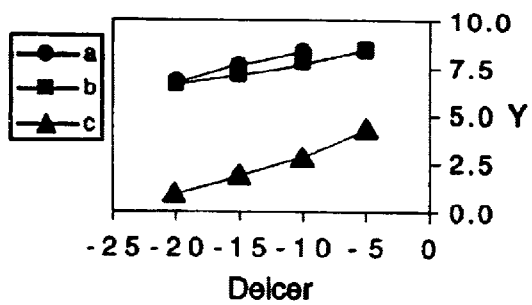
FIG. 9 shows the ice melting performance of "naturally hot" aqueous potassium succinate in the presence of propylene glycol at −20, −25, −10, and −5° C.

As shown in FIG. 9, both a 50 wt % aqueous solution of potassium succinate (a) and a 50 wt % aqueous solution of a 3:2 by wt. mixture of potassium succinate and propylene glycol (b) had significantly greater ice melting capacities compared to a 50% aqueous solution of propylene glycol (c) over a temperature range from −20 to −5° C. The results indicate that the succinate mixtures with or without propylene glycol provide a means for rapidly removing frost and ice accumulated on aircraft wings. A significant advantage is that the exothermic chemical deicing compositions of the present invention substantially reduce the amount of propylene glycol used to deice aircraft wings. Use of propylene glycol has been receiving increasing scrutiny from the U.S. Department of Environmental Protection. Furthermore, the exothermic chemical deicing compositions of the present invention provide a natural heat source in comparison to the electrical heat that is used to heat propylene glycol prior to application which gives the exothermic chemical deicing compositions of the present invention a further cost savings over the use of propylene glycol.

As shown above, the safety and compatibility of the exothermic chemical deicing compositions of the present invention conformed to the requirements of AMS 1435 A. As further shown herein, the exothermic chemical deicing compositions of the present invention are substantially safer for aircraft wing and ground applications than the formate- and acetate-based deicers currently being used in airports worldwide.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

We claim:

1. A process for inhibiting or reducing icing or snow on a surface which comprises:
   (a) mixing as reactants an acidic succinic compound and a base in an aqueous solution to produce a succinate salt at a pH between 4 and 11 as a deicing composition, wherein the reactants heat the solution; and
   (b) applying the heated solution to the surface to inhibit or reduce the icing or snow.

2. The process of claim 1 wherein the reactants are in a dry, granular form and are in at least one container for use in step (a).

3. The process of claim 1 wherein the acidic succinic compound is selected from the group consisting of succinic anhydride, succinic acid, and mixtures thereof.

4. The process of claim 1 or 2 wherein the base is selected from the group consisting of an alkali metal, an alkaline earth metal, a hydroxy organic base, and mixtures thereof.

5. The process of claim 1 or 2 wherein the base is selected from the group consisting of sodium hydroxide, potassium hydroxide, ammonium hydroxide, and mixtures thereof.

6. The process of claim 1 or 2 wherein a polyhydric alcohol anti-icing organic compound is mixed with the solution applied in step (b).

7. The process of claim 6 wherein the polyhydric alcohol is selected from the group consisting of ethylene glycol, diethylene glycol, propylene glycol, and dipropylene glycol propylene glycol.

8. The process of claim 6 wherein the polyhydric alcohol is propylene glycol.

9. A kit for use in producing a heated solution which comprises:
   (a) at least one container of amounts of compounds which react exothermally to produce a succinate salt at a pH between about 4 and 11 when combined with amounts of water to produce the heated solution, wherein the compounds are an acidic succinic compound and a base; and
   (b) instructions in the kit for combining the compounds with water to produce the heated solution.

10. The kit of claim 9 containing an additional container of water to combine with the components.

11. The kit of claim 10 wherein the compounds which react are contained in separate containers which are sold as a unit.

12. The kit of claim 10 wherein the containers have an openable seal between the containers for mixing.

13. The kit of claim 9 wherein the compounds are in a dry, granular form.

14. The kit of any one of claims 9, 10, 11, 12, or 13 wherein the acidic succinic compound is selected from the group consisting of succinic anhydride, succinic acid, and mixtures thereof.

15. The kit of any one of claims 9, 10, 11, 12, or 13 wherein the base is selected from the group consisting of an alkali material, an alkaline earth metal, a hydroxy organic base, and mixtures thereof.

16. The kit of any one of claims 9, 10, 11, 12, or 13 wherein the base is selected from the group consisting of sodium hydroxide, potassium hydroxide, ammonium hydroxide, and mixtures thereof.

17. The kit of any one of claims 9, 10, 11, 12, or 13 comprising a polyhydric alcohol anti-icing organic compound.

18. The kit of claim 17 wherein the polyhydric alcohol is selected from the group consisting of ethylene glycol, diethylene glycol, propylene glycol, and dipropylene glycol propylene glycol.

19. The kit of claim 17 wherein the polyhydric alcohol is propylene glycol.

20. A kit for sale as a unit in producing a heated solution which comprises amounts of compounds which react exothermally to produce a succinate salt at a pH between about 4 and 11 when combined with amounts of water to produce the heated solution, wherein the compounds are an acidic succinic compound and a base.

21. The kit of claim 20 wherein the base is selected from the group consisting of an alkali material, an alkaline earth metal, hydroxy organic base and mixtures thereof and the acidic succinic compound is selected from the group consisting of succinic anhydride, succinic acid and mixtures thereof.

22. A process for producing a heated solution for applying heat to a surface to melt ice or snow which comprises:
   (a) mixing as reactants a pre-measured acidic succinic compound and a base into an aqueous solution to produce a succinate salt at a pH between about 4 and 11; and
   (b) applying the heated solution to the surface so as to heat to the surface to melt the ice or snow.

23. The process of claim 22 wherein the reactants are in a dry, granular form and are in at least one container for use in step (a).

24. The process of claim 22 wherein the acidic succinic compound is selected from the group consisting of succinic anhydride, succinic acid, and mixtures thereof.

25. The process of claim 22 or 23 wherein the base is selected from the group consisting of an alkali metal, an alkaline earth metal, a hydroxy organic base, and mixtures thereof.

26. The process of claim 22 or 23 wherein the base is selected from the group consisting of sodium hydroxide, potassium hydroxide, ammonium hydroxide, and mixtures thereof.

27. The process of claim 22 or 23 wherein a polyhydric alcohol anti-icing organic compound is mixed with the solution applied in step (b).

28. The process of claim 27 wherein the polyhydric alcohol is selected from the group consisting of ethylene glycol, diethylene glycol, propylene glycol, and dipropylene glycol propylene glycol.

29. The process of claim 27 wherein the polyhydric alcohol is propylene glycol.

* * * * *

UNITED STATES PATENT AND TRADEMARK OFFICE
CERTIFICATE OF CORRECTION

PATENT NO. : 6,623,657 B1  Page 1 of 1
DATED : September 23, 2003
INVENTOR(S) : Kris A. Berglund, Dilum D. Dunuwila and Hasan Alizadeh It is certified that error appears in the above-identified patent and that said Letters Patent is hereby corrected as shown below:

Column 2,
Line 51, "posses a short" should be -- possess a short --.

Column 6,
Line 13, "350 C" should read -- 35ºC --.

Column 12,
Line 65, "succinate .water propylene glycol" should be -- succinate :water :propylene glycol --.

Column 17,
Line 11, "(2) sight" should be -- (2) slight --.

Column 20,
Line 63, "-50ºC" should be -- 5ºC --.

Column 24,
Line 25, "heat to the surface" should be -- heat the surface --

Signed and Sealed this

Thirtieth Day of December, 2003

JAMES E. ROGAN
*Director of the United States Patent and Trademark Office*